Patented June 16, 1925.

UNITED STATES PATENT OFFICE.

ERNEST HOPKINSON AND WILLIS A. GIBBONS, OF NEW YORK, N. Y., ASSIGNORS TO REVERE RUBBER COMPANY, OF CHELSEA, MASSACHUSETTS, A CORPORATION OF RHODE ISLAND.

PROCESS FOR EMPLOYING WATER SOLUTIONS OF RUBBER AND ARTICLES SO PRODUCED.

No Drawing. Application filed February 3, 1922. Serial No. 533,776.

*To all whom it may concern:*

Be it known that we, ERNEST HOPKINSON and WILLIS A. GIBBONS, both citizens of the United States, and residents of New York, county of New York, and State of New York, have invented certain new and useful Improvements in Processes for Employing Water Solutions of Rubber and Articles so Produced, of which the following is a full, clear, and exact description.

This invention relates to processes for employing water emulsions of rubber, that is rubber latex or similar material either in its original state or concentrated or diluted; and to the articles so produced.

Heretofore a restricted class of articles has been fabricated from rubber cements, that is solutions of crude rubber in benzol or similar solvent directly by dipping. An example of such procedure is the formation of surgeon's gloves by dipping a form into a rubber cement, removing the form, allowing the solvent to evaporate to form a thin coating of rubber on the form and alternately dipping and drying the form and its adhering coating until a sufficient thickness of rubber has been built up, whereupon the glove is stripped off and vulcanized. Approximately 5 alternate dippings and dryings are employed for the fabrication of the glove in this manner requiring approximately one day for the completion of the process and a number of handling or equivalent mechanical operations in moving forms into and out of the cement.

One of the objects of the present invention accordingly is to provide a process for employing rubber latex or the like in which fabrication of articles may be carried out by one dipping or by fewer dippings than heretofore practiced with cements. Another object is to provide a less expensive, less time-consuming process of the kind mentioned by eliminating various steps necessary to the manufacture of rubber cements and also to eliminate the danger through fire or explosion and expense of organic solvents. Another object is to provide a process of the kind mentioned wherein the fluid of the latex enclosed in the interior of a form or mold, may be removed without opening the mold during the forming process. Another object is to provide an article so fabricated of tough, unmilled unhandled rubber having a high tensile strength, greater resilience, and greater resistance to wear.

The invention accordingly consists in depositing a rubber article from rubber-containing or similar latex on a surface and vulcanizing the article so deposited.

By rubber-containing or a similar latex is meant juices or fluids producing rubber or balata or gutta percha either in its original state or concentrated or diluted as desired.

As an example of a process for forming a surgeon's glove, whereby the alternate dipping and drying on the form is eliminated, the following procedure may be carried out: A form in the shape of a hand, made of porous material, for example unglazed porcelain or chinaware, is immersed in latex preferably that of *Hevea brasiliensis* containing approximately 40–50% rubber and allowed to remain submerged to the proper depth at ordinary room temperature for an interval of time corresponding to the thickness of the rubber desired. 15 or 30 minutes is sufficient for the manufacture of a surgeon's glove. The form is then withdrawn from the liquid, allowed to drip and the rubber thereupon is dried at room temperature or at a slightly elevated temperature.

The withdrawal of water from the mass of latex adjacent the form is effected through the pores of the porous material and causes a segregation or collection of thickened latex adhering to the form. This withdrawal of water takes place toward the interior of the form while the latter is immersed and upon withdrawal of the form elimination of water from the adherent mass takes place not only towards the interior but also by ordinary exterior evaporation. The drying of the glove which has a thickness when dry of .012" requires approximately one hour.

The glove so produced is vulcanized preferably by dipping in the following solution: benzol 100 parts by weight, zinc butyl xanthogenate 3 parts by weight, dibenzylamine 3 parts by weight, and sulphur 1 part by weight. The proportion of these it will be understood may be varied depending on the conditions of vulcanization desired. An immersion of one or two minutes at room temperature followed by air drying and vulcanization for 1 hr. at 212° F. produces a satisfactorily vulcanized article, or after dipping if the glove is allowed to stand for approximately 3 weeks vulcanization is satisfactorily accomplished. In any event the glove is then treated with talc and stripped from the form in the usual way. In place of the vulcanization process mentioned sulphur-chloride-vapor-vulcanization may be employed or vulcanization by dipping in a solution of sulphur chloride may be used with satisfactory results; or other known vulcanization methods may be utilized.

It will be observed that the process described is one which utilizes rubber latex direct, that is the rubber is deposited on the form directly. There is no necessity as in the old process of cement making to coagulate, mill, wash and dissolve the rubber prior to its use. It has been found that the rate of deposition of the rubber on the form varies with the time of immersion, and the thickness of the deposit lessens for successive equal intervals of time regardless of the nature of the absorbent medium. The length of drying the coating deposited on the form it will be observed is approximately the same as required for one drying of cement deposited on the usual form. By causing the operation to take place in a single dipping, it will be readily realized that much labor is saved compared with the cement-dipping process.

It will be observed that although latex having a rubber content of 40–50% is indicated in the preferred example, normal latex containing for example 30% rubber may be employed, or more concentrated or more dilute latex as desired. It has been found that the rate of deposit of rubber on the form is substantially constant where the rubber content of the latex is 30 or 40 or 50%. In other words the rate of deposit appears substantially unaffected by the rubber content of the latex.

As an alternative to the process described above the following process may be carried out: A mold of porous material made for example in two sections within which is a cavity, for example in the shape of a hot water bottle, is filled with latex, the two sections being tightly pressed together, and allowed to stand for a time sufficient to form on the interior surface a coating of the desired thickness. A passage is provided in the mold through which latex may be poured into the interior cavity and which will form a neck for the hot water bottle. When sufficient rubber has been deposited on the inside of the mold the remaining liquid which is now enclosed in a sack of deposited rubber is poured out through the opening provided at the neck of the hot water bottle and the deposit is dried at ordinary or elevated temperature and vulcanized as hereinbefore set forth or in any desired manner.

Substantially any porous material capable of sucking up water by capillarity appears to be able to deposit latex on its surface, and to permit its removal therefrom. Where the article is to be removed from the form or mold the pores are of a size such that rubber particles may not pass to an appreciable distance into the mold, since if this action occurs it will be found difficult or impossible to remove the rubber coating. Of course it should not be porous to an extent such that the latex as a whole may pass through it. Surfaces which are satisfactorily absorbent but not sufficiently smooth can be made smooth by polishing or immersing them in a suspension of finely powdered china clay or similar porous material in finely powdered form with a subsequent drying of the china clay or other coating on the form. Instead of this dipping, the clay or other material may be rubbed or brushed on to the form. In place of the unglazed porcelain or china mentioned above the material known as silocel may be employed for making the desired forms. This is a natural deposit of tightly compressed diatomaceous earth.

Many of the water soluble constituents of the latex are withdrawn in solution from the latex into the interior of the porous form employed so that the deposit of rubber on the surface is lower in protein and salt content than would be obtained if the latex were evaporated down with all these constituents. The soluble constituents drawn into the form may be washed out by immersion of the form in fresh water or by any other desired means such as by heating or chemicals. In the case of glove forms a simple immersion in plain water is sufficient, the water soluble constituents passing through the form which is hollow into the interior cavity from which they may be poured out, the form then being dried at an elevated temperature.

A modification of the procedure consisting in filling the cavity with latex consists in introducing sufficient latex to give an article for example a water bottle the desired wall thickness without leaving an excess of latex on the interior of the bottle at the time when a deposit of the required thickness is obtained. In other words the quantity of latex employed has a rubber content just sufficient to provide the article and the fluid of the latex passes substantially entirely into the porous material leaving an empty article behind. In carrying out the process with just sufficient latex for the formation of the article the mold is preferably slowly rotated about a horizontal axis so that the rubber may be evenly deposited over the entire surface. Rotation of course may be employed in the case where an excess of latex is used as above described.

It has been found that the deposit of rubber made by the immersion of porous materials in latex serves as a convenient means for concentrating the latex and obtaining a substance which may be reconverted into the original latex by simple addition of water. In other words the deposit on the surface of the porous material if placed in water will return to latex. Pressure of the particles or agitation in forming the deposit on the form prior to their immersion in the water should be avoided as such action tends to cause the deposit to form a mass which upon addition of water may be partially or wholly incapable of being converted into latex. The material removed from the porous surface contains normally 80–85% of rubber.

In place of the porous forms described above, glazed forms may be employed for example a glazed form similar to that ordinarily used in the dipping process employing cements. In carrying out such a process in its preferred form latex, preferably concentrated by evaporation to a rubber content of 50–55%, is employed. To this solution a gelatine solution having a gelatine content of 1½–2% based on the weight of the rubber content of the latex is added, along with sufficient water to bring the rubber content to 40–45% approximately. The gelatine increases the viscosity of the latex and aids in the dipping process. The viscosity may be altered as will be observed by concentrating or diluting the solution of latex and gelatine. Into this mixture the glazed form is dipped and withdrawn. The coated form is shaken or otherwise mechanically treated to remove the excess liquid. It is then rapidly turned so that the fingers are uppermost and dried. Drying may be accomplished at room temperature or at slightly elevated temperature, preferably not exceeding 40° C. The coated form after drying is given two further dippings and alternate dryings in case of the manufacture of a surgeon's glove. After the second dipping the form is suspended with the fingers downward and after the third dipping it is again rapidly placed with the fingers upward for the drying process. Three dips will provide a structure of .010 to .012 inches providing a medium weight surgeon's glove.

The glove after drying is preferably dipped in a solution like that employed for vulcanizing the glove made on the porous form.

For the manufacture of sheet rubber from latex an endless belt rotating over rollers suitably spaced apart may be employed. The belt passes through a tank or other receptacle containing latex receiving a coating thereof which is dried and stripped from the belt surface to form a rubber sheet. If desired a series of such dippings and dryings may be alternately made in order to increase the thickness of the sheet. Compounding, vulcanizing and other ingredients may be employed with the latex if desired or may be applied subsequent to the forming of the sheet.

The latex employed in carrying out the various processes is preferably that which has been preserved by addition of ammonia, formaldehyde or other stablizer or preservative, but if desired a latex free from such materials may also be employed containing 20 to 35% rubber. In place of this ordinary latex however, one that has been concentrated to any desired extent for example by evaporation may be employed. In the case of employment of glazed forms a concentrated latex having approximately 40% rubber by weight is employed.

The latex employed may be mixed with any softening, coloring, accelerating or vulcanizing ingredients.

Where substances are admixed it is preferred to keep the latex with the added material in agitation. This may be satisfactorily accomplished in the case of articles formed on the interior of a mold as above described by rotation of the mold.

It will be observed that the processes described eliminate the alternate dipping and drying process heretofore practiced with cement or greatly restricting the number of such dippings and dryings carried out. The use of explosive and inflammable solvents such for example as benzol heretofore used in connection with cements is also avoided by the processes mentioned. Furthermore the expensive and time-consuming processes heretofore required for the preparation of crude rubber involving coagulation of the latex, its washing, drying, baling and subsequent milling for its solution in the solvent, benzol or the like, is avoided. In the case of the deposit of rubber on the interior of the mold it will be seen that the fluid is conveniently removed without manipulation of the mold, that is without opening it to remove fluid during the forming process. The procedures outlined are thus simple and inexpensive and greatly reduce the labor necessary for the formation of various articles heretofore manufactured from cements. The articles manufactured by the processes have in general superior characteristics to similar articles heretofore manufactured from cements in that they are made of tough, unmilled rubber which possesses a high tensile strength, greater resilience and greater resistance to wear. In addition to the articles mentioned there may be made by the processes set forth inner tubes, tobacco pouches, nipples, bulbs, playing balls, balls for floats, pure gum tubing, overshoes and various others. It will be obvious that various manufacturing operations may be combined with the procedure described herein to produce modifications. The articles produced by the processes set forth may be stitched. A fabric either coated or uncoated with rubber may be applied to their surfaces or other parts or fixtures may be embodied in the articles.

It will thus be seen that among others the objects above enumerated are achieved.

As many apparently widely different embodiments of this invention may be made without departing from the spirit thereof, it is to be understood that we do not intend to limit ourselves to the specific embodiment herein set forth except as indicated in the appended claims.

Having thus described our invention, what we claim and desire to protect by Letters Patent is:

1. The method of making rubber articles which comprises continuously depositing on a form solids from a body of latex while maintaining the form in contact with said body, and drying and vulcanizing the article.

2. The method of making rubber articles which comprises continuously building up a deposit of rubber solids on a form by disposing the surface of the form in contact with a body of latex, withdrawing moisture from that portion of the latex in contact with the form, and drying and vulcanizing the article.

3. The method of making rubber articles which comprises continuously building up a deposit of rubber solids on a porous form by maintaining the form in contact with a body of latex and withdrawing moisture through the form, and drying and vulcanizing the article.

4. The method of making rubber articles which comprises gradually and continuously building up a deposit from latex of rubber having substantially the shape of the article and the thickness desired, and vulcanizing the rubber.

5. The method of making rubber articles which comprises gradually and continuously building up by absorption of moisture a deposit from latex of rubber having substantially the shape of the article desired, and vulcanizing the rubber.

6. A process for treating latex which comprises continuously depositing rubber from latex on a porous form to form a rubber article and vulcanizing the article so deposited.

7. A process for treating latex which comprises immersing a porous glove form in latex, allowing the form to remain immersed until a glove of sufficient thickness has been built up on the form, drying the glove so produced, and vulcanizing the glove.

8. The step in the process of forming rubber articles which comprises gradually and continuously building up by absorption of moisture a deposit from latex of rubber having substantially the shape of the article desired.

9. A process for concentrating latex which comprises continuously withdrawing moisture from within a body of latex without elevating its temperature, and segregating the concentrated latex in said body.

10. A process for concentrating latex which comprises withdrawing moisture therefrom by porous material, and collecting the concentrated latex on the surface of said material.

11. A process for concentrating latex which comprises bringing latex in contact with a porous structure impermeable to latex as a whole but permeable to the water and dissolved constituents therein and depositing a coating on the structure having an uncoagulated rubber content higher than that of the original latex.

12. A process for concentrating latex which comprises bringing latex in contact with a porous structure impermeable to latex as a whole but permeable to the water and dissolved constituents therein and depositing a coating on the structure having a rubber content of 80 to 85%.

13. The method of making rubber articles which consists in continuously segregating solids from a body of latex on the surface of a form of desired contour by withdrawing moisture from the latex at said surface until the desired thickness of deposit is obtained, withdrawing the form from the latex and drying the deposit, and vulcanizing.

14. An article built up by continuous deposition on a form of rubber from a body of latex.

15. A hollow vulcanized article gradually built up on a form as a continuous deposit of rubber from latex.

16. A surgeon's glove built up on a form as a dense continuous deposit of rubber directly from a body of latex.

Signed at New York, New York, this 31st day of January, 1922.

ERNEST HOPKINSON.

Signed at New York, New York, this 25 day of January, 1922.

WILLIS A. GIBBONS.